Patented Feb. 28, 1928.

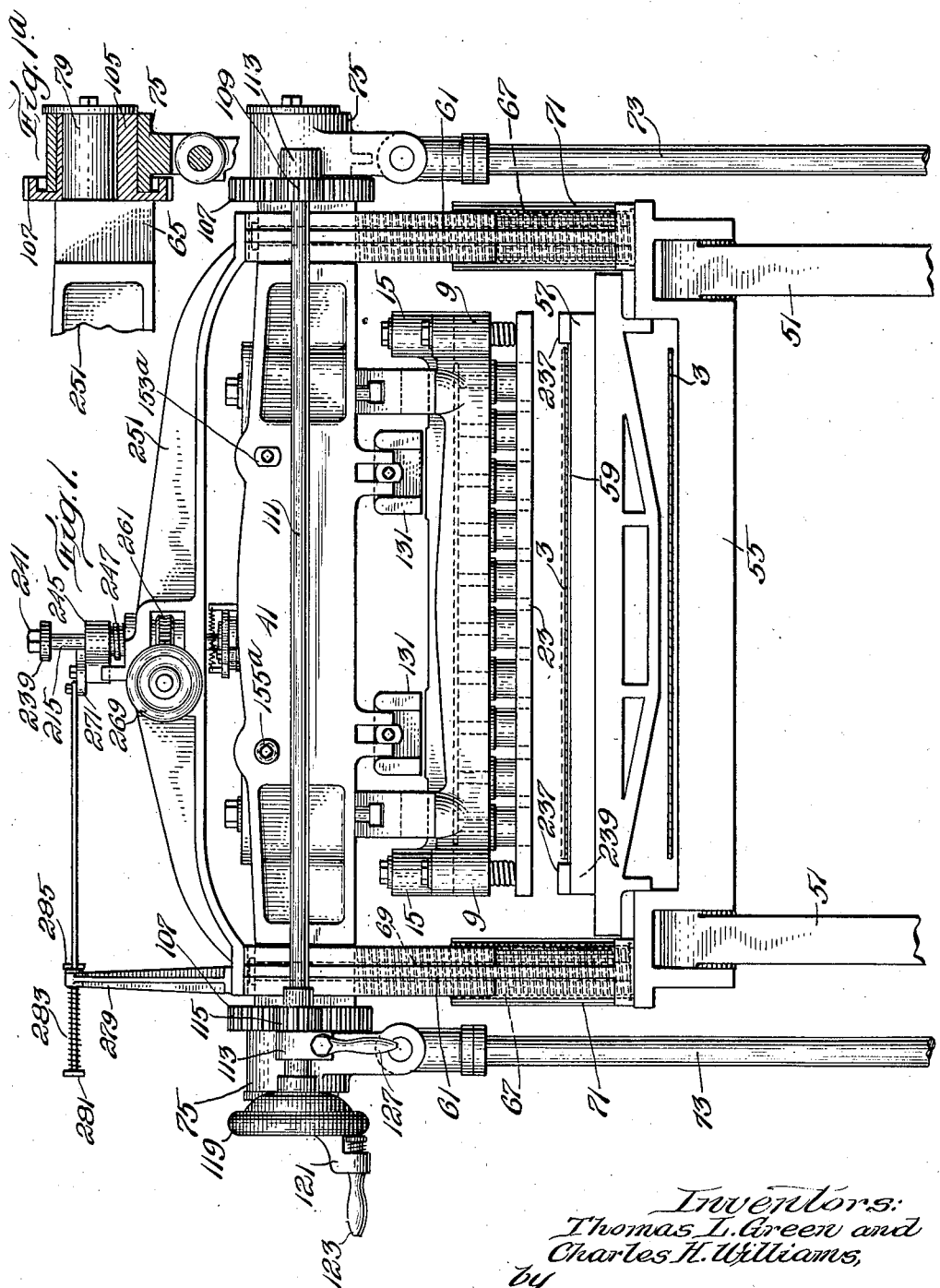

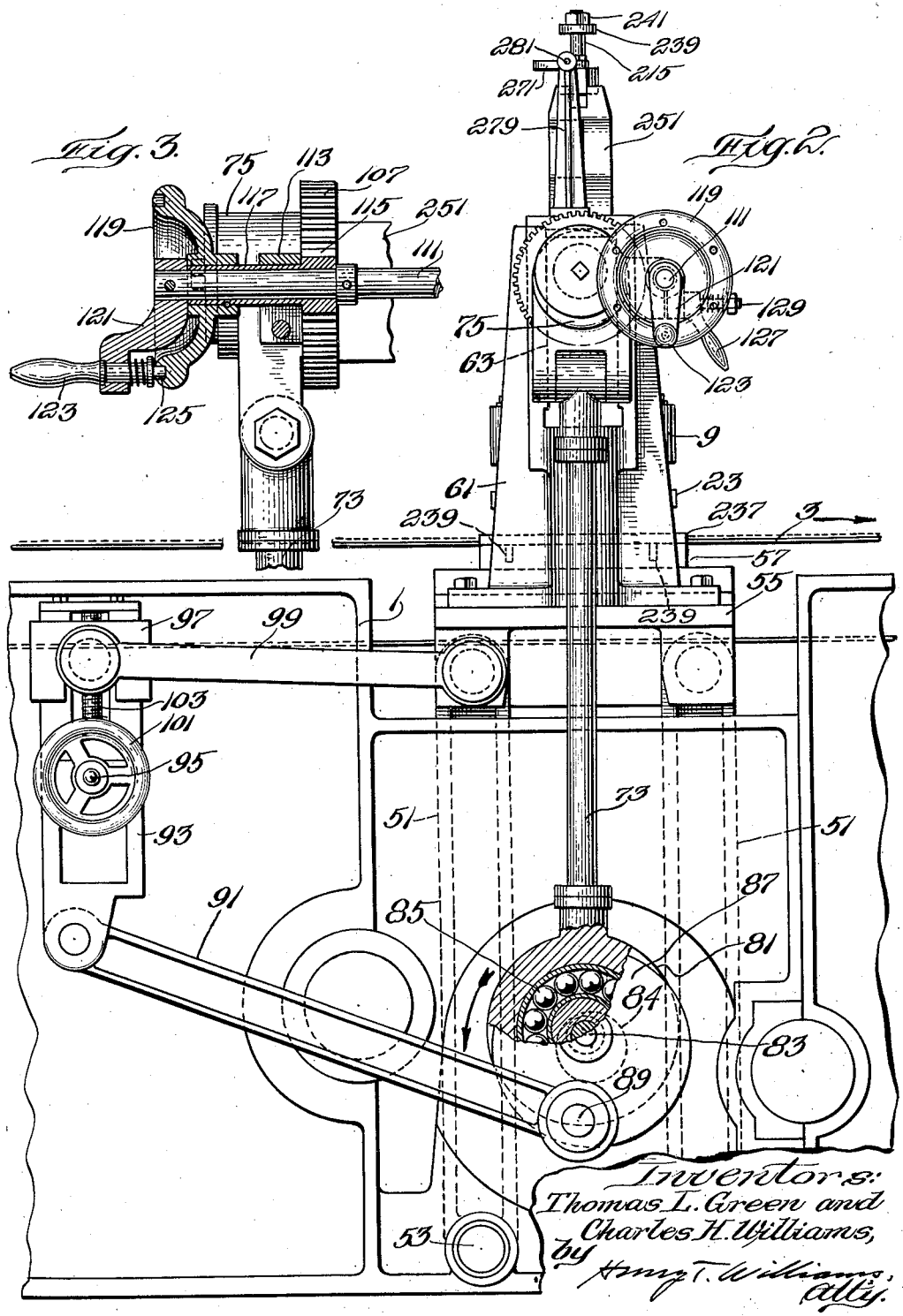

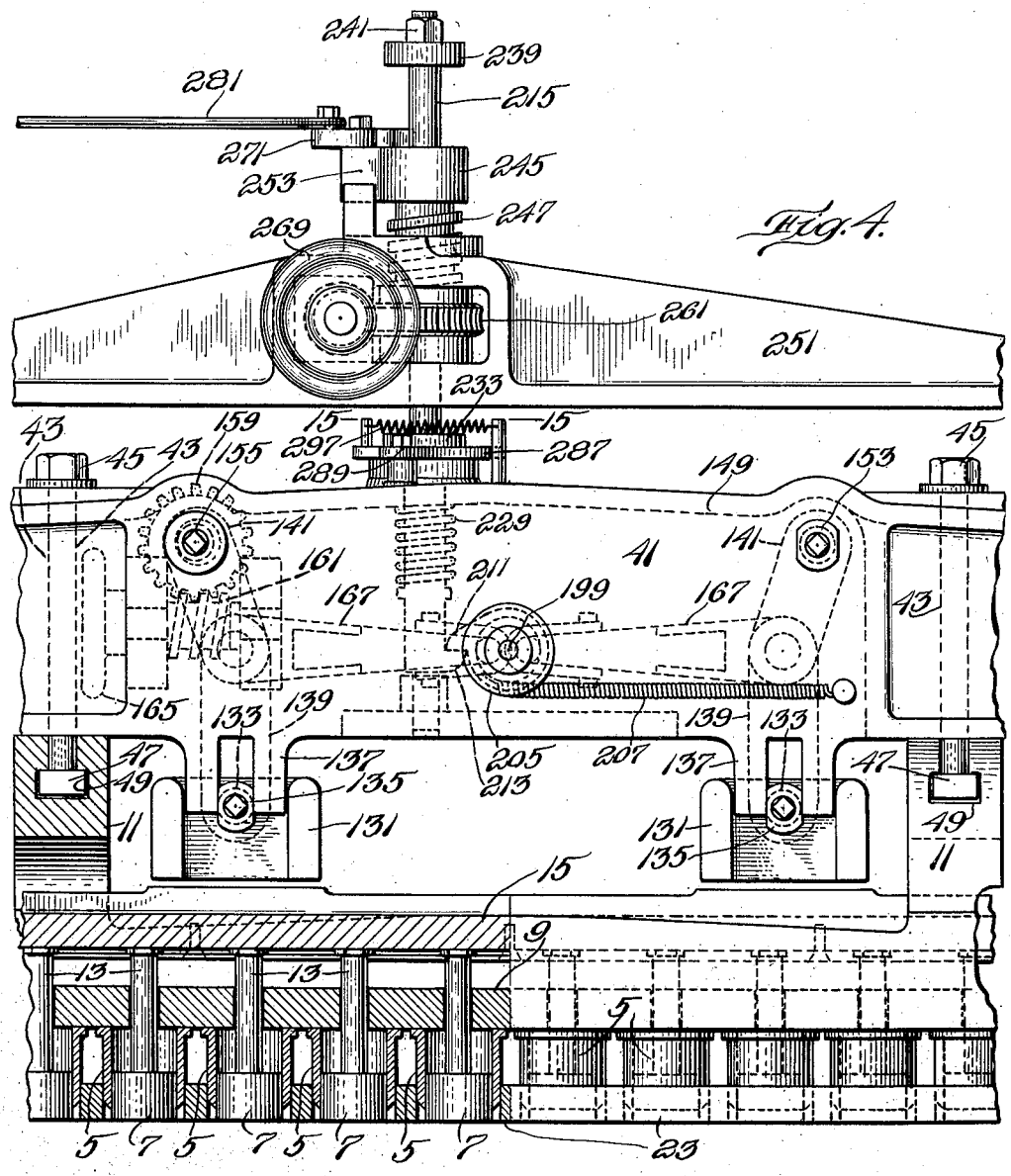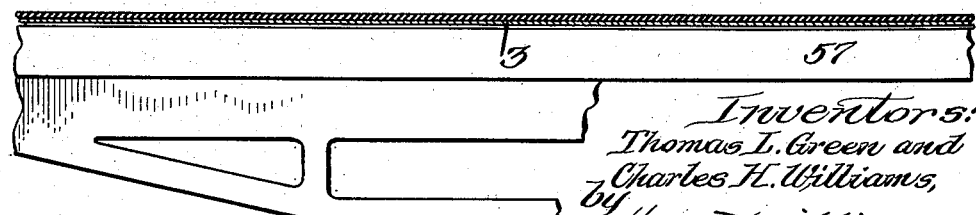

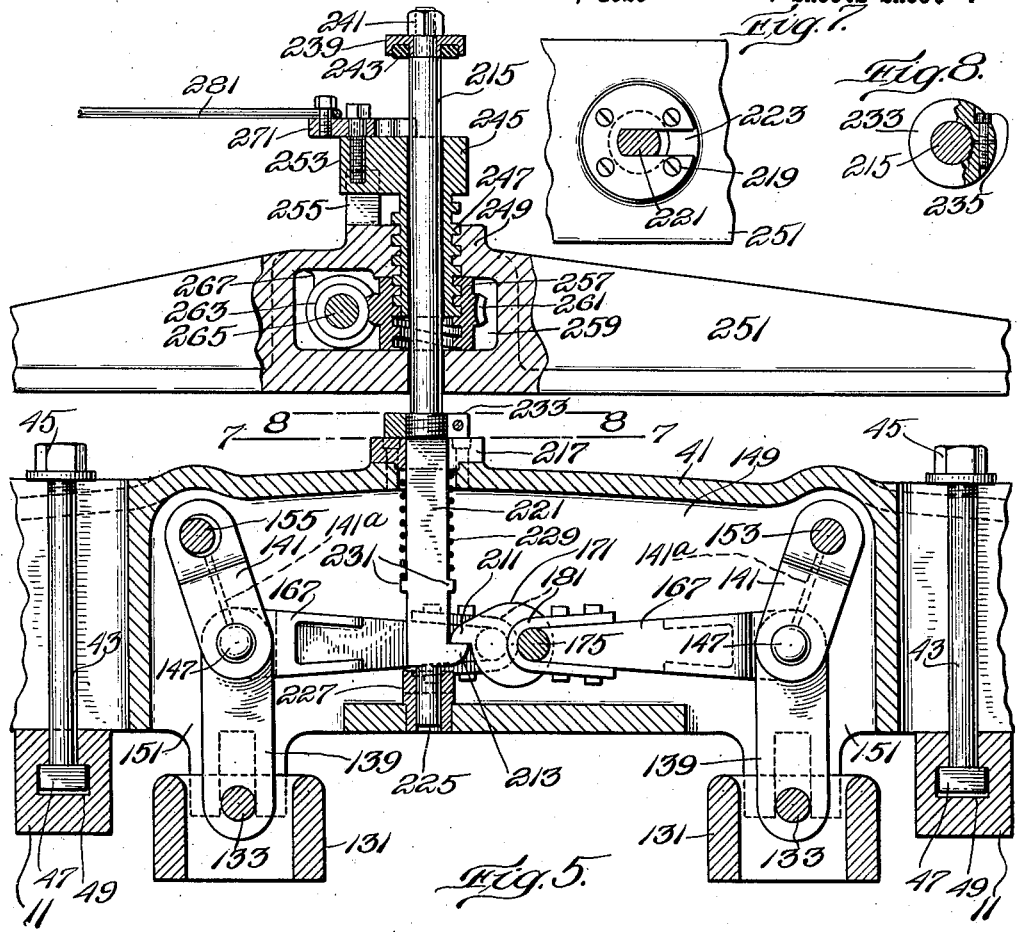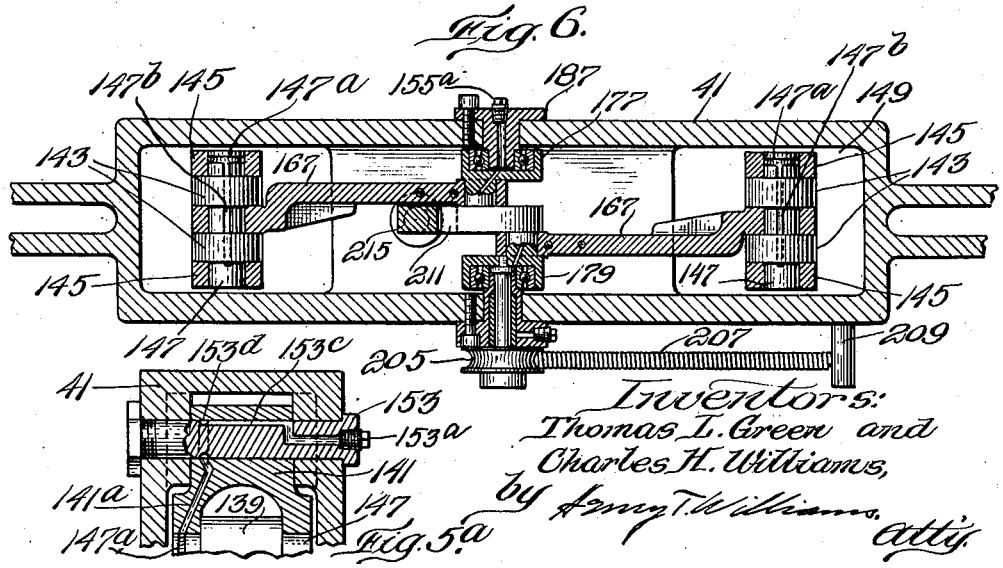

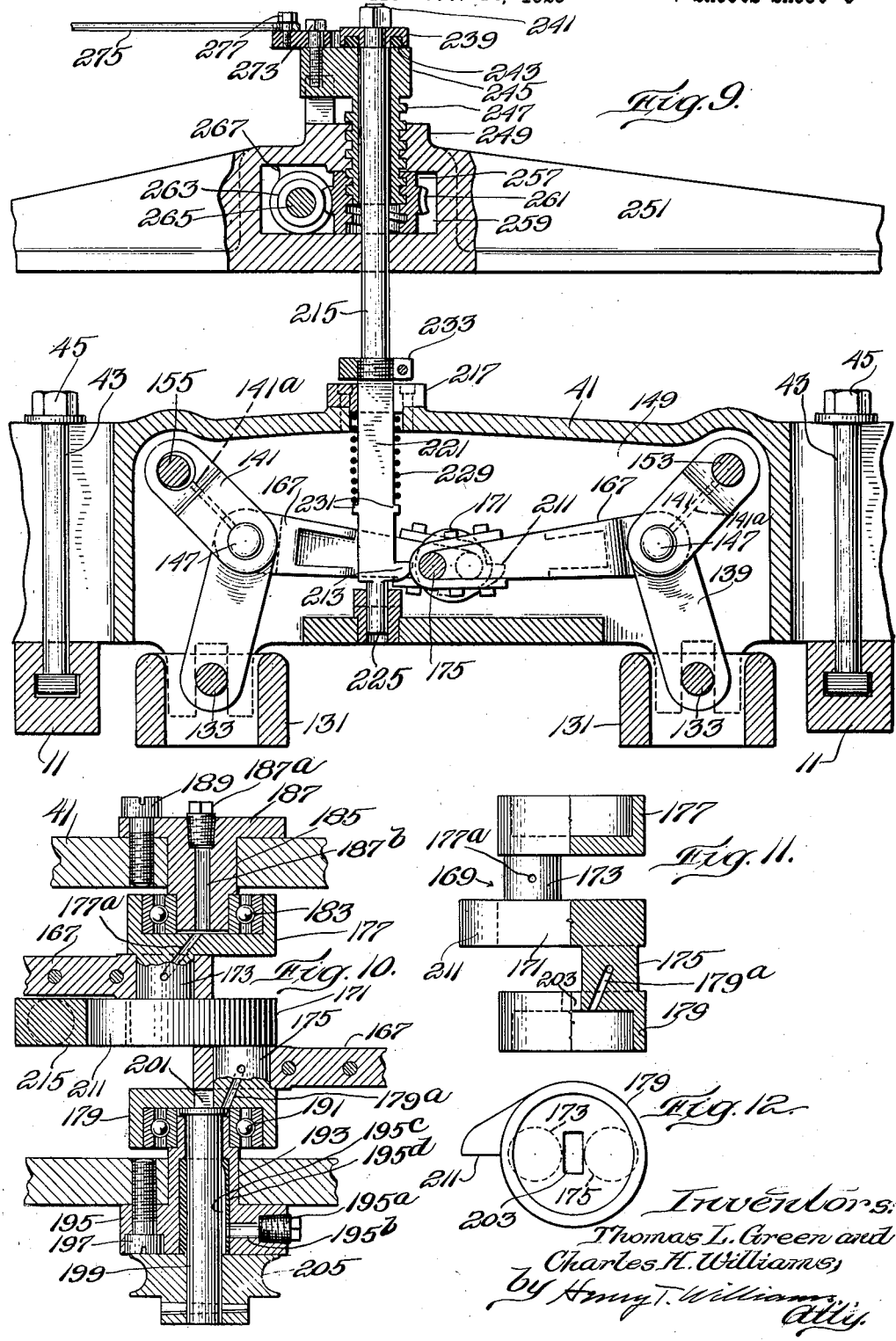

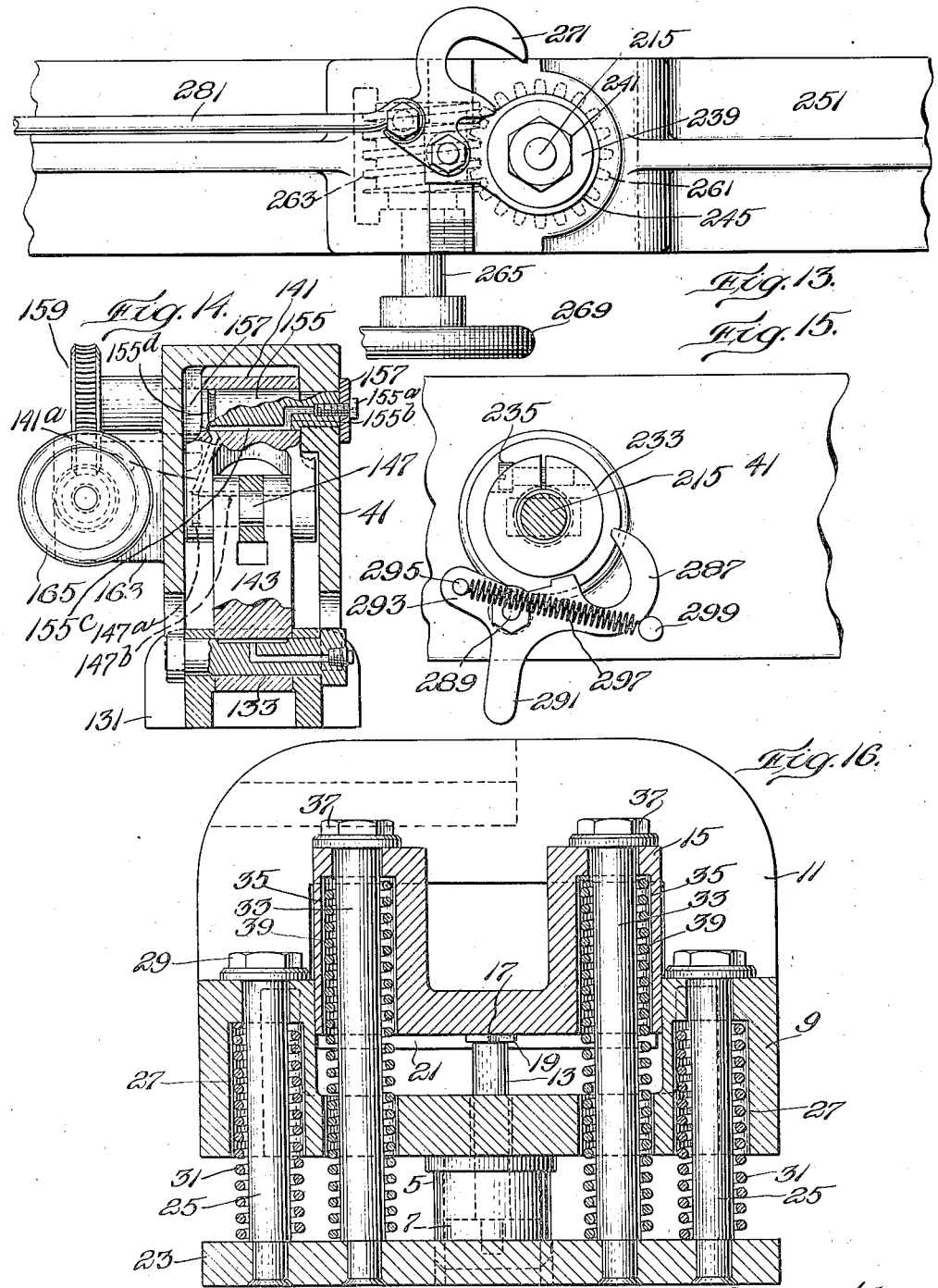

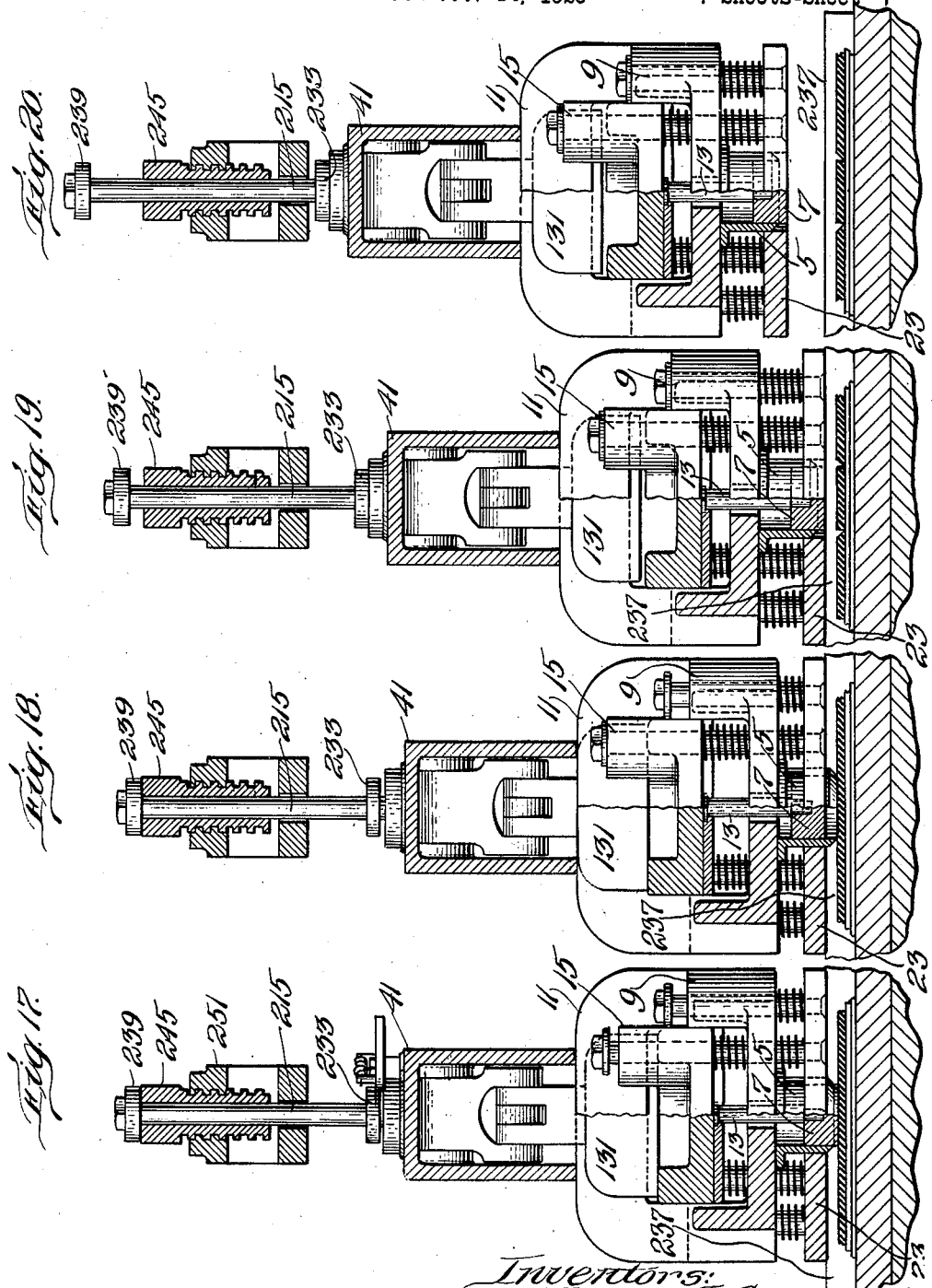

1,660,553

UNITED STATES PATENT OFFICE.

THOMAS L. GREEN AND CHARLES H. WILLIAMS, OF INDIANAPOLIS, INDIANA, ASSIGNORS TO SAID GREEN.

BISCUIT CUTTING AND EMBOSSING MACHINE.

Application filed October 14, 1925. Serial No. 62,350.

The invention to be hereinafter described relates to a machine for cutting and embossing biscuits.

The invention is applicable to machines of the type in which a sheet of dough is fed by an endless apron beneath vertically reciprocating cutters and embossers carried by a frame which is horizontally reciprocated, the construction being such that the cutters and embossers are moved in unison with the travel of the dough sheet when acting thereon.

One of the purposes of the invention is to provide improved means for operating the cutters and embossers, the construction being such that the embossers attack and leave the dough sheet so rapidly that highly desirable embossing is produced.

In carrying this feature of the invention into practical effect, in the present instance, the cutters and embossers are carried by a single cross-head which operates to reciprocate the cutters and embossers, but the embossers are retracted from the dough sheet by a mechanism which is so sensitive and quick acting that the instant the embossers complete their impress on the dough sheet, they are snapped upwardly away therefrom.

In cutting and embossing the biscuits by the present machine, the embossers and cutters advance toward the dough sheet with the embossers in the lead, so that they engage the sheet and make their impress prior to cutting or dieing out the biscuits therefrom. The embossers retreat from the sheet and tend to lift the same somewhat before the cutters engage the sheet. The upward movement of the embossers relatively to the cutters causes the latter to clear the sheet from the embossers. Then the cutters move down and die out the biscuits from the sheet. The cutters move upward somewhat beyond the embossers so that the embossers in turn clear the died-out biscuits from the cutters. The cutters also move upward relatively to a stripper plate which clears from the cutters the scrap dough surrounding the died-out biscuits.

Since the cutters and embossers have such brief contact with the dough sheet, it is practicable to employ a simple crank motion for imparting the horizontal reciprocations to the cutter and embosser carrying frame, the operations being so timed that there is no relative travel between the cutters and embossers and the dough sheet in a horizontal direction when the cutters and embossers are acting on the dough sheet.

The mechanism of the present application not only enables highly efficient embossing and cutting of the biscuits, but also enables operation of the machine at high speed, and its capacity of production is materially greater than can be had by any machine heretofore known to us.

This mechanism enables a biscuit manufacturer to have a single machine which is capable of making crackers or biscuits, embossing, panning and peeling, and therefore, it makes possible what may be termed a universal biscuit cutting machine. It can emboss doughs of different character, and can emboss soft cakes more uniformly and with less spread or displacement of the dough than heretofore possible. It is not necessary that the dough sheet shall stick to the apron as has heretofore been essential in embossing work, as this method produces biscuits with rough bottoms. However, this mechanism will successfully emboss dough which may purposely be stuck to the apron as, for example, in making sandwich goods, where it is desirable that the bottom of the product shall be rough.

With the aforesaid and other purposes in view, the character of the invention may be best understood by reference to the following description of one good form thereof shown in the accompanying drawings, wherein:

Fig. 1 is a front elevation of a portion of a biscuit cutting and embossing machine embodying the invention;

Fig. 1ª is a sectional detail of an end portion of the cross-head and parts associated therewith;

Fig. 2 is a side elevation of the biscuit cutting and embossing mechanism;

Fig. 3 on an enlarged scale is a sectional detail of the device for adjusting the cross-head carrying the cutters and embossers;

Fig. 4 on an enlarged scale is a view partly in elevation and partly in section of a portion of the mechanism shown in Fig. 1;

Fig. 5 is a vertical section illustrating the toggle and double crank device with the parts disposed in holding position;

Fig. 5ª is a sectional view showing means for lubricating one of the toggle carrying studs and one of the hinge pins;

Fig. 6 is a horizontal section through the construction shown in Fig. 5;

Fig. 7 is a horizontal section taken on line 7—7 of Fig. 5;

Fig. 8 is a horizontal section taken on line 8—8 of Fig. 5;

Fig. 9 is a view similar to Fig. 5 showing the toggle and double crank device in releasing position;

Fig. 10 on an enlarged scale is a horizontal section through a portion of the cross-head box containing the toggle and double crank device;

Fig. 11 is a plan of the double crank, portions being shown in section;

Fig. 12 is an end view of the double crank shown in Fig. 11;

Fig. 13 is a plan of a portion of the bridge bar showing the adjustable means for interrupting the operation of the embossers;

Fig. 14 is a vertical section through the cross-head showing one of the toggles and the eccentric means for adjusting the same;

Fig. 15 is a horizontal section taken on line 15—15 of Fig. 4;

Fig. 16 is a transverse section through the cutter and embosser heads; and

Figs. 17 to 20 are views partly in elevation and partly in section showing different positions assumed by the cutters and embossers and parts associated therewith.

Referring to the drawings, the portion of the biscuit cutting and embossing machine shown therein as illustrating one good form of the invention, comprises a pair of side plates 1 (Fig. 2) which extend the length of the machine and carry the usual rollers and driving means (not shown) for causing the travel of the endless apron 3, the upper run of which is adapted to convey the dough sheet beneath the cutters and embossers.

Cutters 5 are provided, in the present instance of cup form, and within the cutters are embossers 7, in the present instance of plunger form. The cutters are secured to a channel-shaped cutter-head 9 (Figs. 1, 4 and 16) provided with a pair of yokes 11 bridging the cutter-head. The embossers are secured to the lower ends of stems 13 which are entered through holes in the bottom of the cutter-head, and the upper ends of said stems are secured to a channel-shaped embosser-head 15 slidable between the sides of the cutter-head. In the present instance the stems 13 have hexagonal heads 17 which rest in a groove 19 in a plate 21 secured to the under side of the embosser-head, the construction being such that the embossers cannot turn in the cup cutters.

Beneath the cutter-head is a clearer plate 23 having holes for receiving the cutters. This plate is connected to the cutter-head by studs 25 which pass through pockets 27 in the cutter-head, and at the outer ends of the studs are heads 29 adapted to engage the upper surfaces of the sides of the cutter-head. Coil springs 31 encircle the studs 25, enter the pockets 27 and are confined between the clearer plate and ends of the pockets 27. The construction is such that the springs urge the clearer plate downward until limited by engagement of the stud heads 29 with the supper surfaces of the sides of the cutter-head, but the clearer plate is susceptible of movement upward relative to the cutter-head, as will be more fully hereinafter described.

The embosser-head is yieldingly supported by the clearer plate, and to accomplish this, studs 33 are provided having their lower ends secured to the clearer plate. These studs pass through holes in the bottom of the cutter-head and through pockets 35 in the embosser-head. At the upper ends of the studs 33 are heads 37 adapted for engagement with the upper surfaces of the sides of the embosser-head. Coil springs 39 encircle the studs 33, enter the pockets 35, and are confined between the clearer plate and ends of the pockets. The construction is such that the coil springs urge the embosser-head upward away from the clearer plate until limited by engagement of the upper surfaces of the embosser-head with the stud heads 37. The cutter and embosser construction just described constitutes a unit, and may be substantially the same as that disclosed in the copending application of Thomas L. Green, Serial No. 664,391, filed September 24, 1923.

The cutter and embosser unit just described is detachably secured to a cross-head 41 (Figs. 1 and 4) by bolts 43 extending vertically through the cross-head and having nuts 45 for engagement with the top of the cross-head. At the lower ends of the bolts 43 are heads 47 entered into T-shaped slots 49 in the cutter-head yokes 11 referred to. The construction is such that the cutter and embosser unit may be laterally presented to the cross-head, and in the course of this movement the yoke slots 49 will slide along the bolt heads 47 until limited by engagement of the ends of the slots with the bolt heads. Thereupon, the nuts 45 may be set up, thereby securely to connect the cutter and embosser unit to the cross-head. The machine may be equipped with a complement of cutter and embosser units for work of varying character, and the construction is such that one unit may be quickly and easily substituted for another in the machine.

The cross-head is carried by a frame which is reciprocable in a horizontal direction. This frame comprises pairs of rocker arms 51 (Figs. 1 and 2) at opposite sides of the machine and adapted to oscillate with parallel motion about the axes of shafts 53 mounted on the side plates 1 referred to. The upper ends of the rocker arms are connected to a saddle 55 carrying a bed plate 57 over which the upper run of the apron 3, referred to, passes, a suitable pad 59 being interposed between the bed plate and the apron.

Mounted on the saddle 55 at opposite ends thereof are stands 61 having guideways 63 adapted to receive flattened portions 65 (Fig. 1ª) of the cross-head. Cushioning coil springs 67 (Fig. 1) encircle rods 69 depending from the cross-head. Said springs have portions occupying deep cups 71 mounted on the saddle, and the upper ends of the springs bear the cross-head.

Suitable means is provided for reciprocating the cross-head in the guideways of the stands. In the present instance, this means comprises connecting rods 73 (Figs. 1 and 2) having their upper ends pivotally connected to sleeves 75 on trunnions 79 (Fig. 1ª) at the ends of the cross-head. The lower ends of the connecting rods are secured to straps 81 receiving crank wrist pins 83 on a shaft 84 which may be driven in any suitable manner, ball bearings 85 being provided between the straps and wrist pins.

To produce the horizontal reciprocation of the cutter and embosser carrying frame a disk 87 (Fig. 2) is mounted on an end of the crank shaft and has a wrist pin 89 connected by a connecting rod 91 with the lower end of one of a pair of rocker arms 93 mounted on a shaft 95. On the upper ends of the rocker arms 93 are blocks 97 connected by links 99 with the saddle 55 referred to. The extent of oscillation of the cutter and embosser carrying frame may be varied by adjusting the blocks 97 along the rocker arms 93. This adjustment may be accomplished by a hand wheel 101 operating through mitre gears and screws 103 threaded to the blocks as is understood in the art.

It is desirable to adjust the cutter bar in order that the embossers and cutters shall have the required relation to the bed plate 57 and the work operated upon. To accomplish this, eccentric sleeves 105 (Fig. 1ª) are interposed between the crosshead trunnions 79 and the connecting rod sleeves 75, said eccentrics being provided with spur gears 107. One of these gears meshes with a pinion 109 (Fig. 1) fast on a shaft 111 journalled in bearings 113 carried by the connecting rod sleeves 75. The other spur gear meshes with a pinion 115 (Fig. 3) fast on a sleeve 117 mounted on the shaft 111. A hand wheel 119 is fast on the sleeve 117 and an arm 121 is fast on the shaft 111. A handle 123 is carried by the arm 121 and has a pin 125 adapted to enter any one of several sockets in the hand wheel 119. The construction is such that when the pin 125 locks the hand wheel and arm together, rotation of the hand wheel will cause simultaneous and equal rotation of the pinions 109 and 115 and thereby impart equal adjustments to the eccentrics 105. If it is desired to adjust the right end of the cross-head (Fig. 1), the handle 123 is pulled outward thereby releasing the arm 121 from the hand wheel 119 and allowing the arm 121 to be turned independently of the hand wheel. If it is desired to adjust the left end of the cross-head (Fig. 1), the hand wheel 119 is turned independently of the arm 121. To hold the sleeve shaft 117 in its positions of adjustment, the bearing 113 at the front of the machine is split, and the parts may be pressed together or released by adjustment of a hand nut 127 (Figs. 1 and 2) threaded on a stud 129 projecting from one part of the bearing through a hole in the other part thereof.

An important feature of the invention is the mechanism for operating the embossers, and as stated, its character is such that the embossing of the biscuits may be accomplished more perfectly than heretofore, and at high speed. This mechanism, in the present instance of the invention, comprises a pair of shoes 131 (Figs. 1, 4, 7 and 9) having pins 133 provided with flat-faced collars 135 adapted to slide in guide forks 137 depending from the cross-head. The shoe pins 133 are connected to toggles, each comprising a lower link 139 and an upper link 141. The lower link 139 has a fork 143 and the upper link has a wider fork 145 receiving the lower link fork 143. These forks have registering holes through which passes a hinge pin 147. The toggles are incased by a box 149 (Figs. 5 and 9) formed in the cross-head and having at the bottom thereof openings 151 through which the lower links of the toggles extend. The upper links of the toggles are carried by studs 153 and 155 (Figs. 5, 9 and 14) mounted on the cross-head box and extending across the same.

It is desirable that one of the toggles may be adjustable, in order to secure proper alignment of the embosser-head in relation to the bed plate 57. To this end the left toggle stud 155 is journalled in bearings 157 formed on the cross-head box, and the portion of said stud which passes through the upper link is eccentric in respect to the axis of the stud. To impart rotative adjustment to the stud, it is provided with a worm gear 159 (Figs. 4 and 14) meshing with a worm 161 mounted in a bearing bracket 163 on the cross-head, the worm being provided with a hand wheel 165. The construction is such that the hand wheel may be turned and operate through the worm and worm gear, thereby to give the desired adjustment to the eccentric, and the worm and worm gear will hold the eccentric in its different positions of adjustment.

Connecting rods 167 (Figs. 4, 5, 6 and 9) have ends received by the lower toggle forks 143 and mounted on the toggle hinge pins 147. These connecting rods extend toward each other in a general horizontal direction and are housed in the cross-head box.

A double crank 169 (Figs. 10 and 11) comprises a disk 171, a pair of wrist pins 173 and 175 and bearing cups 177 and 179, all formed in one integral piece. The connecting rods have straps 181 for connecting the adjacent ends of the rods with the double crank wrist pins. The crank cup 177 receives a ball bearing 183 (Fig. 10) mounted on a stud 185 entered through a hole in a wall of the cross-head box, said stud having a cap 187 secured by screws 189 to said wall. The crank cup 179 receives a ball bearing 191 mounted on a stud 193 entered through a hole in a wall of the cross-head box, said stud having a cap 195 secured by screws 197 to the wall. A small shaft 199 extends through the stud 193 and has a key 201 occupying an elongated hole 203 in the bottom of the crank cup 179. Secured to the outer end of the shaft 199 is a sheave 205. A coil spring 207 has one end thereof secured to the sheave and its opposite end secured to a pin 209 on the cross-head box. This spring is arranged so that it tends to rotate the double crank in a contra-clockwise direction (Fig. 4).

The toggles and connecting rods intermittently have the positions shown in Figs. 5 and 9. To hold the connecting rods 167 in substantial alignment, the crank disk 171 is formed to provide a nose 211 for engagement with a latch 213 on a vertical rod 215 mounted in an upper guide 217 (Figs. 5 and 7) secured by screws 219 to the top of the cross-head box. The rod has a flat-sided portion 221 passing through a slot 223 in the guide 217 to prevent rotation of the rod and thereby hold the latch 213 in the same plane as the disk nose 211. The latch rod has a reduced cylindrical end portion 225 projecting into a guide 227 mounted on the bottom wall of the cross-head box. A coil spring 229 encircles the latch rod and is confined between lugs 231 on the latch rod and the bottom of the guide 217, the upper wall of the cross-head box having a hole therein sufficiently large to admit the coil spring. A split nut 233 (Figs. 5 and 8) is threaded to the rod, and after it has been given proper adjustment, it is locked to the rod by a screw 235. The construction is such that the coil spring 229 tends to hold the rod in a position in which the nut 233 engages the top of the guide 217 which serves as a stop.

When the cross-head moves downward, the clearer plate 23 referred to, will meet stops or lugs 237 (Fig. 1) mounted on the bed plate 57 at opposite ends thereof, said stops having dowels 239 adapted to enter suitable holes in the bed plate, the construction being such that stops of different thicknesses may be used according to the thickness of the dough sheet. The arrest of the clearer plate by its engagement with the stops 237 and the continued downward movement of the cross-head will cause compression of the clearer plate coil springs 31 and compression of the embosser coil springs 39. The compression of the embosser springs will tend to move the embosser-head upward relatively to the cutterhead, but this movement is prevented by the engagement of the embosser-head with the shoes 131 and the pressure reacting from the shoes through the toggles and the aligned connecting rods. This pressure has a component of force which reacts to the studs 153 and 155 which carry the toggles, and the pressure has a smaller component of force which presses the aligned connecting rods toward each other.

The pressure which originates in the embosser springs and reacts on the connecting rods as described, is a potential force which throws the double crank from its position shown in Fig. 5 to its position shown in Fig. 9, and on this occurrence the toggles receive a buckling motion which releases the shoes and allows the embosser springs to snap the embosser-head upward until limited by engagement with the stud heads 37.

Next will be described means for automatically slightly shifting the latch rod to move the double crank wrist pins out of a dead center or substantially dead center relation and thereby allow the releasing action of the toggle mechanism. This means, in the present instance, comprises a button or washer 239 (Figs. 1, 4, 5 and 9) secured by a nut 241 to the reduced upper end of the latch rod, the under face of the washer being recessed to receive a fibre ring 243. Cooperating with the button is a stop, in the present instance, in the form of a sleeve 245 which has a portion 247 threaded in a boss 249 on a bridge bar 251 which extends across the machine and is mounted upon and secured to the tops of the reciprocating frame stands 61 referred to. To confine the threaded sleeve against rotation but admit a certain amount of longitudinal movement thereof, the sleeve is provided with a fin 253 received by a fork 255 standing up from the bridge bar. To impart the longitudinal adjustment to the sleeve, a nut 257 is threaded on the sleeve and mounted in an opening 259 in the bridge bar. The nut has a worm gear 261 formed thereon meshing with a worm 263 on a shaft 265 mounted in a bearing 267 on the bridge, said shaft being provided with a hand wheel 269 (Fig. 13). The construction is such that on rotation of the hand wheel, the nut will be rotated and cause longitudinal movement of the threaded sleeve 247, and the latter will be locked by the worm and worm gear in its positions of adjustment. The sleeve should be set in a position to bring the top thereof in the proper position to serve as a stop to be engaged by the latch rod button 239, and this should occur when the embossers have almost reached their downward limit of movement. The button is carried bodily by the cross-head, and the sleeve stop is in a fixed position on the bridge bar. Therefore, in the course of the downward movement of the cross-head the button will approach and then be brought into engagement with the sleeve stop, as shown in Fig. 9. This will check further downward movement of the latch rod, and thereupon, further downward movement of the cross-head will cause the double crank disk to shift sufficiently to destroy the dead center relation of the wrist pins. On occurrence of this event the potential force, developed be the embosser springs as described, becames available to throw the double crank in a clockwise direction from its position shown in Fig. 5 to that shown in Fig. 9. The coil spring 207 limits the throw-over movement of the double crank through an arc of about 180°. The further downward movement of the cross-head after engagement of the button with the sleeve stop causes the guide stop 217 to move somewhat away from the nut 233 as it appears in Fig. 9. When the cross-head moves upward sufficiently, the toggle mechanism will be automatically restored from its releasing position to its holding position by the coil spring 207 as assisted by the action of gravity on the shoes and toggles.

It is important that the working parts of the toggle and double crank mechanism shall be properly lubricated. To accomplish this, the right toggle carrying stud 153 has a tapped hole in one end thereof normally closed by a plug 153$^a$. This hole is connected by an L-shaped duct 153$^b$ with a groove 153$^c$ at the side of the stud and communicating with a circumferential groove 153$^d$ in the stud. An end of the left toggle carrying stud 155 (Fig. 5) has a tapped hole normally closed by a plug 155$^a$. An L-shaped duct 155$^b$ extends from said hole to a groove 155$^c$ at the side of the stud and communicating with a circumferential groove 155$^d$. The lubricant is conveyed from the toggle studs 153 and 155 to the toggle hinge pins 147 through ducts 141$^a$ in the upper toggle links 141. The hinge pins have circumferential grooves 147$^a$ registering with the link ducts 141$^a$ and adapted to supply the lubricant to grooves 147$^b$ at the sides of the hinge pins.

To lubricate the double crank the stud 187 (Fig. 10) has a tapped hole therein normally closed by a plug 187$^a$ and communicating with an axial duct 187$^b$ which leads to a space between the end of the stud and the bottom of the double crank cup 177, thereby supplying lubricant to the ball bearing 183. The lubricant is conveyed thence through a diagonal duct 177$^a$ to the double crank wrist pin 173. The stud 195 has a tapped hole normally closed by a plug 195$^a$, and communicates with a duct 195$^b$ leading to a longitudinal groove 195$^c$ in a bushing 195$^d$ receiving the sheave shaft 199. A bore in the stud receiving the inner portion of the shaft 199 is somewhat larger than the shaft and allows the lubricant to pass to the ball bearing 191. The lubricant is conducted thence through a diagonal duct 179$^a$ to the double crank wrist pin 175. Thus, the lubricant may be readily supplied to the parts of the toggle and double crank mechnism enclosed in the cross-head box from points accessible externally of the box.

It is customary in biscuit machines to return the scrap dough surrounding the dried-out biscuits to the feed-in end of the machine where it is mixed with the prime or fresh dough and fed through the usual sheet forming gage rolls. It sometimes happens that lumps or other irregularities are present in the dough sheet occasioned by the scrap mixed with the dough or other cause. It is the duty of the operator of the machine to watch the dough sheet as it travels from the gage rolls to the cutters and embossers, and it is desirable to provide means whereby he may quickly interrupt the embossing operation while the irregular portion of the dough sheet passes beneath the embossers, in order that the embossers may not partially engage the dough. This would be liable to prevent clearing of the dough from the embossers. The presence of dough partially covering an embosser would prevent succeeding perfect impresses. One of the purposes of the invention, therefore, is to provide means for enabling the operator quickly and easily to interrupt the embossing operation, and quickly and easily permit resuming of the embossing operation. This means, in the present instance of the invention, comprises an interrupter in the form of a hook 271 (Figs. 5, 9 and 12) pivotally mounted on the shank of a screw bolt 273. A rod 275 (Fig. 1) has one end connected by a screw bolt 277 to a spur of the hook. This rod extends through a guide arm 279 mounted on one end of the bridge bar 251. The rod projects somewhat beyond said arm, and has a handle 281 at the end thereof. The rod is urged to hold the interrupter hook 271 in inoperative position by a coil spring 283 encircling the rod and confined between the arm and handle, movement of the rod toward the left (Fig. 1) being limited by engagement with the arm by a cotter pin 285 on the rod. When the operator desires to interrupt the embossing operation, it is merely necessary for him to press the handle 281 against the opposition of the spring 283, thereby moving the interrupter hook 271 toward the latch rod and into a position to be engaged by the latch rod button 239. This will release the toggle mechanism and prevent the same from holding the embossers down sufficiently far to engage and impress the dough sheet. On release of pressure on the handle 281, the spring 283 will automatically shift the interrupter to its inoperative position shown in Fig. 13, and embossing operations will be resumed.

Sometimes it is desired to cut but not emboss biscuits. Therefore, it is desirable to provide means for preventing operation of the toggle mechanism in order to reduce the wear thereon. Another purpose of the invention, therefore, is to provide a device which may be quickly and easily adjusted to prevent the operation of the toggle mechanism. To accomplish this, in the present instance, an interrupter in the form of a hook 287 (Figs. 4 and 15) is provided and pivotally mounted on a stud 289 standing up from the top of the cross-head. This hook has a handle 291, and a spur 293 carrying a pin 295 connected to one end of a coil spring 297, the opposite end of the latter being connected to a pin 299 standing up on the top of the cross-head. The construction is such that the operator may grasp the handle 291 and move the hook from its inoperative position shown in Fig. 15, to a position in which it stands between the top of the latch rod guide 217 and the latch rod nut 233. This holds the latch 213 upward sufficiently to prevent the latch rod button 239 from engaging the sleeve stop 245 and thus prevents the intermittent tripping of the toggle and double crank mechanism. The coil spring 297 is arranged so that it will hold the hook 287 in active and inactive positions.

In the operation of the machine, when the embosser-head is about to start downward toward the dough sheet, the cutter-head, embosser-head and clearer plate will be in the relation shown in Fig. 16, in which the clearer plate springs are holding the clearer plate carrying studs down with their heads in engagement with the cutter-head, and the embosser springs will hold the embosser-head up against the stud heads 37. In the course of the approach of the cross-head toward the dough sheet, the clearer plate will come into engagement with the stop lugs 237 and be arrested thereby. As the cross-head continues downward, the embosser head will be moved downward away from the stud heads 37, and thereby compress and energize the embosser springs, the embosser-head being held against movement toward the cross-head by the toggle mechanism. As the embossers approach the dough sheet they will be in advance of the cutters and will impress the dough sheet as indicated in Fig. 17 before action of the cutters on the dough sheet. Immediately upon completion of the embossing operation the toggles are broken and the pressure of the shoes on the embosser-head is released so that the previously energized embosser springs immediately become effective to snap the embossers up away from the dough sheet with a sharp, quick movement, and the embosser-head will engage and be limited by the stud heads 37 as indicated in Fig. 18. This movement of the embossers causes the cutters to strip the embossed dough sheet from the embossers. By the action described the embossers have contact with the dough sheet for only an instant, and the operation is such that a highly desirable embossing effect is accomplished.

After the embossers have been snapped up from the dough sheet and the latter has been cleared therefrom, the cutters move down and die out the biscuits from the sheet. Then the cross-head starts upward, and in the initial movement of the cutters away from the dough sheet, the clearer plate remains in engagement with the stops 237, and the embossers stand with their faces on a level with the under face of the clearer plate. As the cutters move on upward, they will arrive in the position shown in Fig. 19, and in the course of their movement the embossers will act as strippers to clear the biscuits from the cutters and the clearer plate will strip the dough scrap surrounding the died-out biscuits from the cutters. The cross-head will move on upward, and the parts will assume their relation shown in Fig. 20, where they are in readiness to come down again and perform the next embossing and cutting operations.

The crank mechanism for reciprocating the cutter and embosser carrying frame is so timed with respect to the vertical reciprocations of the cross-head and with respect to the travel of the apron, that the cutters and embossers travel horizontally in unison with the apron and the dough sheet thereon for the brief period the embossers and cutters are in engagement with the dough sheet. It is obviously unnecessary that the cutters and embossers shall travel horizontally in unison with the apron and dough sheet at other times. The quick snapping of the embossers and their head as occasioned by the quick, sudden release by the toggle mechanism of the embosser-head to the action of the embosser springs, and the use of crank motions for reciprocating the cross-head vertically and horizontally permit the machine to operate at high speed, and at the same time products are obtained of superior quality.

The mechanism of the present application may be desirably used in place of the cutting mechanism disclosed in the application of Thomas L. Green, Serial No. 5,497, filed January 29, 1925, and reference may be had to said application for understanding of parts of the biscuit machine not shown and described herein. It will be understood by those skilled in the art that the mechanism of the present application may also be used in biscuit machines other than that disclosed in said application. This mechanism may be used in a convertible machine, that is, one which is so constructed that the biscuits may be automatically deposited on pans, or the biscuits may be removed from the machine by a baker's peel. Also, the present mechanism is such that biscuits may be cut, or cut and embossed. Various cutting and embossing units may be readily substituted for the unit shown herein, which is detachably secured to the cross-head, according to the character of the work required. While the machine has been described more particularly in respect to embossing and cutting out biscuits from a dough sheet, other materials might be operated upon.

It will be understood that the invention is not limited to the specific embodiment shown, and that various deviations may be made therefrom without departing from the spirit and scope of the appended claims.

What is claimed is:

1. In a machine of the character described, the combination of an embosser and a cutter adapted to act on sheet material, a reciprocable cross-head for causing the embosser and cutter to act on the material, and means for automatically snapping the embosser away from the material at the instant it completes its embossing operation.

2. In a machine of the character described, the combination of an embosser and a cutter adapted to act on sheet material, reciprocable means carrying and actuating the embosser and cutter and having provision for advancing the embosser and cutter to the material in the order named, and means for automatically snapping the embosser away from the material at the instant it completes its embossing operation.

3. In a machine of the character described, the combination of an embosser and a cutter adapted to act on sheet material, a reciprocable cross-head for advancing the embosser and cutter to the material, spring means energized by advance of the cross-head, and means carried by the cross-head and cooperating with a fixed part of the machine to render the spring means effective to snap the embosser sharply from the material when it completes its embossing operation.

4. In a machine of the character described, the combination of an embosser and a cutter adapted to act on sheet material, a reciprocable cross-head for advancing the embosser and cutter to the material, embosser retracting means energized by advance of the cross-head, and a release device including a fixed member, and an element carried by the cross-head cooperating to actuate the release device and render the embosser retracting means effective to snap the embosser away from the material on completion of the embossing operation.

5. In a machine of the character described, the combination of an embosser and a cutter adapted to act on sheet material, a reciprocable cross-head for advancing the embosser and cutter to the material, embosser retracting means energized by advance of the cross-head, and a release device on the cross-head including a pair of toggles, a pair of cranks having wrist-pins diametrically opposed, connecting rods connecting the toggles with the wrist-pins, and a latch for holding the connecting rods substantially in alinement; and means automatically to trip the latch when the embosser completes the embossing operation, thereby to allow the energy of the embosser retracting means to buckle the toggles, throw the connecting rods out of alinement and retract the embosser from the material.

6. In a machine of the character described, the combination of an embosser, a cutter, a cross-head carrying the embosser and cutter, means to reciprocate the cross-head and thereby intermittently advance the embosser and cutter to sheet material, embosser retracting means energized by advance of the cross-head, and automatic means including a toggle device operable to render the embosser retracting means effective to withdraw the embosser from the sheet material.

7. In a machine of the character described, the combination of an embosser, a cutter, a cross-head carrying the embosser and cutter, means to reciprocate the cross-head and thereby intermittently advance the embosser and cutter to sheet material in the order named, and means automatically to snap the embosser away from the material in the course of the advance of the cutter to the material.

8. In a machine of the character described, the combination of an embosser, a cutter, reciprocating means intermittently to present the embosser and cutter to material to be embossed and cut, and means automatically to snap the embosser away from the material simultaneously with completion of its advance to the material.

9. In a machine of the character described, the combination of an embosser and a cutter adapted to emboss and cut material, a reciprocable cross-head carryng the embosser and cutter, spring means for retracting the embosser from the material and energized on movement of the cross-head toward the material, toggle means on the cross-head operable to prevent movement of the embosser by said spring means away from the material, and means permitting buckling motion of the toggle means and retracting of the embosser by the spring means on completion of the embossing operation.

10. In a machine of the character described, the combination of an embosser and a cutter adapted to emboss and cut material, a cross-head for reciprocating the embosser and cutter, spring means for retracting the embosser away from the material and energized on movement of the cross-head toward the material, toggles on the cross-head operable to prevent movement of the embosser toward the cross-head, a crank shaft having a pair of cranks thereon with diametrically opposed wrist-pins, connecting rods connecting the toggles with the wrist-pins, an element on and rotative with the crank shaft, a rod bodily movable with the cross-head and having a latch for engagement with said element to hold the connecting rods substantially in alinement and prevent buckling motion of the toggles, and means for arresting the movement of the rod as the embosser approaches its downward limit, thereby to cause the rotative element to turn and allow the spring means to buckle the toggles, impart rotative motion to the crank shaft and snap the embosser away from the material.

11. In a machine of the character described, the combination of an embosser and a cutter adapted to emboss and cut material, means for reciprocating the embosser and cutter, embosser retracting means energized by advance of the embosser toward the material, and means including a toggle device operable to render the embosser retracting means effective to withdraw the embosser from the sheet material; and means for restoring the toggle device to a position for preventing operation of the embosser retracting means.

12. In a machine of the character described, the combination of an embosser and a cutter adapted to emboss and cut material, means to reciprocate the embosser and cutter, embosser retracting means energized on advance of the embosser toward the material, and releasable holding means including a trip device for preventing the embosser retracting means from retracting the embosser from the material and automatically operable to allow the retracting means to withdraw the embosser from the material.

13. In a machine of the character described, the combination of an embosser and a cutter adapted to emboss and cut material, means for reciprocating the embosser and cutter, embosser retracting means for snapping the embosser away from the material, and releasing means for rendering the embosser retracting means effective to retract the embosser when the embosser completes the embossing operation, said releasing means having provision for automatically resetting the same to position for preventing the embosser retracting means from withdrawing the embosser from the material.

14. In a machine of the character described, the combination of an embosser and a cutter adapted to emboss and cut material, a reciprocable cross-head carrying the embosser and cutter, means for retracting the embosser from the material energized on movement of the cross-head toward the material, and holding means for preventing the retracting means from withdrawing the embosser from the material until the embosser has advanced to its limit, comprising a pair of toggles, a double crank, a pair of connecting rods connecting the toggles with the double crank, and means for holding the connecting rods substantially in alinement; and means for automatically releasing the holding means, thereby permitting the embosser retracting means to impart buckling motion to the toggles, throw the connecting rods out of alinement, and withdraw the embosser from the material.

15. In a machine of the character described, the combination of an embosser and a cutter adapted to emboss and cut material, a reciprocable cross-head for advancing the embosser and cutter to the material, means for retracting the embosser from the material energized on advance of the cross-head, holding means carried by the cross-head for preventing the retracting means from withdrawing the embosser from the material as the embosser moves to the material, means for automatically releasing the holding means to allow operation of the embosser retracting means, and means for automatically restoring the holding means to position for preventing operation of the embosser retracting means.

16. In a machine of the character described, the combination of an embosser-head, embossers thereon, a cutter-head, cutters thereon, a cross-head for reciprocating the embosser and cutter heads, means for retracting the embosser-head from the material including springs energized on advance of the embosser-head toward the material, holding means carried by the cross-head for engagement with the embosser head to prevent retracting of the embossers from the material as they advance to the same, and means for automatically releasing the holding means, thereby to permit the springs to snap the embosser-head and embossers from the material on completion of the embossing operation.

17. In a machine of the character described, the ecombination of an embosser-head, embossers carried thereby, a cutter-head, cutters carried thereby, a cross-head for reciprocating the embosser and cutter heads, means for retracting the embosser-head from the material operated upon by the embossers and cutters including springs energized on advance of the embosser-head toward the material, a pair of toggle devices carried by the cross-head having shoes for engagement with the embosser-head, a double crank, connecting rods connecting the toggle devices with the crank, means to hold the double crank in position to prevent movement of the embosser-head toward the cross-head and prevent release of the springs as the embosser-head advances the embossers to complete the embossing operation, and means automatically to permit rotative movement of the double crank, thereby to permit buckling motion of the toggles and permit the springs to snap the embosser-head away from the material.

18. In a machine of the character described, the combination of an embosser-head, embossers thereon, a cutter-head, cutters thereon, a cross-head for reciprocating the embossers and cutters relatively to material to be embossed and cut, stop means, a clearer plate carried by the cutter-head, studs connected to the clearer plate having heads, coil springs on the studs tending to hold the embosser-head against said stud heads, said clearer plate being adapted to engage the stop means and cause the embosser-head to compress the springs as the embossers approach the material, holding means carried by the cross-head for engagement with the embosser-head to prevent movement of the embosser-head toward the cross-head on arrest of the clearer plate by the stop means, and means automatically to release the holding means on completion of the embossing operation, thereby to render the springs effective to snap the embosser-head and embossers away from the material.

19. In a machine of the character described, the combination of an embosser-head, embossers thereon, a cutter-head, cutters thereon, a clearer associated with the embosser and cutter heads, a reciprocable cross-head carrying the embosser and cutter heads and the clearer, spring means confined between the embosser-head and the clearer, holding means carried by the cross-head for preventing movement of the embosser-head toward the cross-head on advance of the latter toward the material to be operated upon by the embosser and cutter, stop means for arresting movement of the clearer and causing energization of the spring means, and means automatically to release the holding means, thereby to render the energized spring means effective to snap the embosser-head and the embossers away from the material.

20. In a machine of the character described, the combination of an embosser and a cutter for embossing and cutting material, a cross-head for reciprocating the embosser and cutter, embosser retracting means including spring means, stop means for energizing the spring means as the embosser advances toward the material, and holding means for preventing the embosser from moving toward the cross-head as the embosser is advanced to the material, and means automatically to release the holding means on the instant the embosser completes its embossing operation, thereby to allow the spring means to snap the embosser away from the material.

21. In a machine of the character described, the combination of an embosser and a cutter adapted for embossing and cutting out biscuits from a dough sheet, and reciprocable means carrying and actuating the embosser and cutter with provision for causing the embosser to make an impress on the dough sheet and instantly snap away from the sheet during the advance of the cutter toward and prior to the engagement of the cutter with the dough sheet.

22. In a machine of the character described, the combination of an embosser and a cutter adapted for embossing and cutting out biscuits from a dough sheet, a cross-head for reciprocating the embosser and cutter, means for retracting the embosser from the sheet energized as the embosser approaches the sheet, means for automatically rendering the retracting means effective to withdraw the embossers from the sheet comprising a pair of toggles carried by the cross-head, a double crank, connecting rods connecting the toggles with the double crank, a holding element associated with the crank, a rod carried by the cross-head having a latch for engagement with the holding element to hold the connecting rods substantially in alinement as the embosser advances to the sheet, an abutment on the cross-head, a nut on the rod, a coil spring on the rod tending to hold the nut against the abutment, and a fixed element on the machine adapted to be engaged by the rod as it moves bodily with the cross-head, thereby to shift the cross-head relatively to the rod and cause the latch to trip the double crank holding element and permit the retracting means to withdraw the embosser from the sheet.

23. In a machine of the character described, the combination of an embosser and a cutter, means for reciprocating the embosser and cutter that they may emboss and cut sheet material, and means for temporarily interrupting the embossing operation to prevent embossing imperfect portions of the sheet material and without disturbing the setting of the machine for resuming the embossing operation.

24. In a machine of the character described, the combination of an embosser and a cutter, means for reciprocating the embosser and cutter that they may emboss and cut sheet material, and means for temporarily interrupting the embossing operation without interference with the cutting operation and without disturbing the setting of the machine for resuming the embossing operation.

25. In a machine of the character described, the combination of a cross-head, an embosser and a cutter carried and reciprocated thereby that they may emboss and cut sheet material, and manually actuated control means for temporarily interrupting the embossing operation and having provision for automatically resuming the embossing operation on release of the control means.

26. In a machine of the character described, the combination of an embosser and a cutter, means for reciprocating the embosser and the cutter that they may emboss and cut sheet material, and means for temporarily interrupting the embossing operation without disturbing the setting of the machine for resuming the embossing operation, said means including an interrupter, and manually operable means for shifting the interrupter to a position to prevent the engagement of the embosser with the sheet material.

27. In a machine of the character described, the combination of an embosser and a cutter, means for reciprocating the embosser and cutter that they may emboss and cut sheet material, means for retracting the embosser from the material including a trip device automatically operable when the embosser completes its impress on the material, and an interrupter device for causing operation of the trip device before the embosser engages the material.

28. In a machine of the character described, the combination of an embosser and a cutter, means for reciprocating the embosser and cutter that they may emboss and cut sheet material, means for retracting the embosser from the material including spring means for urging the embosser away from the material, holding means for preventing movement of the embosser away from the material, a trip device for releasing the holding means to render the spring means effective to retract the embosser from the material when the embosser completes its impression on the material, and an interrupter device for causing the trip device to release the holding means before the embosser engages the material, thereby to prevent the embossing operation.

29. In a machine of the character described, the combination of an embosser and a cutter, means for reciprocating the embosser and cutter that they may cut and emboss sheet material, means including a toggle and double crank mechanism for retracting the embosser from the material when it completes its embossing operation, and means adapted to be set and remain in position to prevent the operation of said mechanism.

30. In a machine of the character described, the combination of an embosser and a cutter, means for reciprocating the embosser and cutter that they may cut and emboss sheet material, means including spring means urging the embosser away from the material, holding means for preventing operation of the spring means, a trip device for the holding means including a stop, and an element for engagement with the stop to cause the trip device to release the holding means when the embosser completes its impress on the material, and means operable to prevent the element from engaging the stop and tripping the holding means, and thereby prevent the embossing operation.

31. In a machine of the character described, the combination of an embosser and a cutter, means for reciprocating the embosser and cutter that they may emboss and cut sheet material, spring means for retracting the embosser from the material and energized as the embosser approaches the material, holding means for preventing the spring means from retracting the embosser, and a trip device for the holding means including a normally fixed stop for causing the trip device to release the holding means and allow the spring means to retract the embosser when the latter has embossed the material, and means for adjusting the stop in order that it may actuate the trip device appropriately for sheet material of different thicknesses.

32. In a machine of the character described, the combination of an embosser and a cutter, means for reciprocating the embosser and cutter that they may emboss and cut sheet material, and a mechanism for retracting the embosser away from the material including a stop, and a device carried by the reciprocating means for engaging said stop and causing the retracting operation; and means for setting said stop at different elevations according to the thickness of the sheet material operated upon.

33. In a machine of the character described, the combination of an embosser and a cutter, a cross-head for reciprocating the embosser and cutter that they may cut and emboss material, a frame, a stop on the frame, and a mechanism for retracting the embosser away from the material including spring means energized on movement of the embosser toward the material, holding means on the cross-head for preventing operation of the spring means, and a member movable with the cross-head for engagement with the stop to release the holding means and permit the spring means to retract the embosser away from the material; and means for adjusting the stop to different positions according to the thickness of the material operated upon.

34. In a machine of the character described, the combination of an embosser and a cutter, a cross-head for reciprocating the embosser and cutter that they may emboss and cut material, spring means for retracting the embosser from the material and energized as the cross-head moves toward the material, holding means on the cross-head for preventing the spring means from retracting the embosser, a stop, said holding means having a member for engagement with the stop, thereby to release the holding means and render the spring means effective to retract the embosser, and means for adjusting the stop to different positions according to the thickness of material operated upon and comprising a screw associated with the stop, and manually operable means for rotating the screw.

35. In a machine of the character described, the combination of an embosser and a cutter, means for reciprocating the embosser and cutter that they may emboss and cut material, spring means for retracting the embosser from the material, means operable alternately to prevent and permit retracting of the embosser by the spring means and comprising a toggle and double crank mechanism movable to holding and releasing positions, and means for automatically restoring the double crank to its holding position.

36. In a machine of the character described, the combination of an embosser and a cutter, means for reciprocating the embosser and cutter that they may emboss and cut material, spring means for retracting the embosser from the material, means operable alternately to prevent and permit retracting of the embosser by the spring means and comprising a toggle and double crank mechanism movable to holding and releasing positions, and means including a sheave and spring for restoring the double crank to its holding position.

37. In a machine of the character described, the combination of an embosser and a cutter, a cross-head for reciprocating the embosser and cutter that they may emboss and cut material, means for retracting the embosser from the material including a holding and releasing device comprising toggles, a double crank, and connecting rods connecting the toggles with the double crank, said cross-heads having a box containing the holding and releasing device, and means for lubricating working parts of the toggles and double crank having means accessible externally of the box for supplying lubricant to said parts.

38. In a machine of the character described, the combination of an embosser and a cutter, a cross-head for reciprocating the embosser and cutter that they may emboss and cut material, and means for retracting the embosser from the material including toggles, a double crank journalled in bearings in the cross-head, connecting rods connecting the toggles with wrist pins of the double crank, said cross-head having a box enclosing the toggles, double crank and connecting rods, and a lubricating system for supplying lubricant to the toggles, bearings and wrist pins and having provision for admitting lubricant to the system at points accessible externally of the box.

39. In a machine of the character described, the combination of an embosser and a cutter, a cross-head for reciprocating the embosser and cutter that they may emboss and cut material, and means for retracting the embosser from the material as the cross-head moves toward the material comprising toggles carried by the cross-head, a double crank journalled in bearings on the cross-head, connecting rods connecting the toggles with wrist pins of the double crank, each of said toggles comprising upper and lower links, a stud carrying the upper link, and a hinge pin connecting the links, a box on the cross-head receiving the toggles, each of the toggles having means for supplying lubricant to its stud and hinge pin comprising a duct in the stud opening externally of the box, and ducts for feeding lubricant from the stud through the upper link to the hinge pin.

40. In a machine of the character described, the combination of an embosser and a cutter, a cross-head for reciprocating the embosser and cutter that they may emboss and cut material, and means for retracting the embosser from the material including toggles on the cross-head, a pair of bearing studs on the cross-head, a double crank having a pair of bearing cups, ball bearings interposed between the studs and cups, connecting rods connecting the toggles and double crank wrist pins, said cross-head having a box enclosing the double crank and its bearings, said studs having ducts for receiving lubricant externally of the box and arranged to supply lubricant to the ball bearings and wrist pins.

41. In a machine of the character described, the combination of an embosser and a cutter adapted for embossing and cutting out articles from sheet material fed horizontally beneath the embosser and cutter, means for reciprocating the embosser and cutter with provision for causing the embosser to make an impress on the sheet and instantly on completion of the impress snap away from the sheet, and a crank mechanism for horizontally reciprocating the embosser and cutter and having provision for causing the embosser and cutter to move horizontally momentarily in unison with the sheet material.

42. In a machine of the character described, the combination of a horizontally reciprocable frame, a cross-head carried by said frame, an embosser and a cutter carried by the cross-head, means vertically to reciprocate the cross-head that the embosser and cutter may emboss and cut out articles from sheet material fed beneath the embosser and cutter, means operable to snap the embosser away from the material on completing the embossing operation, and a crank mechanism for reciprocating the frame and having provision for causing the embosser and cutter momentarily to move horizontally in unison with the material.

43. In a machine of the character described, the combination of a horizontally reciprocatory frame, a cross-head carried thereby, an embosser and a cutter carried by the cross-head, means including a crank for vertically reciprocating the cross-head, thereby to cause the embosser and cutter to emboss and cut out articles from sheet material fed continuously beneath the embosser and cutter, spring means for retracting the embosser from the material and energized during movement of the cross-head toward the material, means on the cross-head for automatically rendering the spring means effective to retract the embosser from the material as the cross-head advances toward the latter, and means including a crank for horizontally reciprocating the frame.

44. In a machine of the character described, the combination of a frame, a cross-head carried by said frame, an embosser and a cutter carried by the cross-head, means vertically to reciprocate the cross-head that the embosser and cutter may emboss and cut out articles from sheet material fed beneath the embosser and cutter, embosser retracting means energized on movement of the cross-head toward the material, means carried by the cross-head for rendering the retracting means effective to withdraw the embosser from the material as the cross-head advances toward the material, and means for reciprocating the frame having provision for causing the embosser and cutter to move horizontally in unison with the material while acting thereon.

45. In a machine of the character described, the combination of a cross-head, an embosser and a cutter carried by the cross-head, means vertically to reciprocate the cross-head that the embosser and cutter may emboss and cut out articles from material fed beneath the embosser and cutter, embosser retracting means including means carried by the cross-head automatically to retreat the embosser from the material on completing the embosser operation, and means for moving the embosser and cutter horizontally in unison with the material while acting thereon.

46. In a machine of the character described, the combination of a cross-head, an embosser and a cutter carried by the cross-head, means to reciprocate the cross-head that the embosser and cutter may emboss and cut out articles from sheet material, and embosser retracting means including a pair of toggles carried by said head, a double crank, connecting rods connecting the toggles with the wrist pins of the double crank, and means for adjusting one of said toggles with respect to the cross-head.

47. In a machine of the character described, the combination of a cross-head, an embosser and a cutter carried by the cross-head, means to reciprocate the cross-head that the embosser and cutter may emboss and cut out articles from material, and means for retracting the embosser from the material including a pair of toggles on the cross-head, a double crank on the cross-head, connecting rods connecting the toggles with the wrist pins of the double crank, and means for adjusting one of said toggles in respect to the cross-head comprising an eccentric and a worm and worm gear for adjusting the eccentric and holding the same in different positions of adjustment.

48. In a machine of the character described, the combination of an embosser-head having embossers, a cross-head carrying the embosser-head, yieldable means permitting movement of the embosser-head toward the cross-head, and holding means for intermittently preventing movement of the embosser-head toward the cross-head and comprising a pair of toggles carried by the cross-head having shoes for engagement with the embosser-head, a double crank on the cross-head, connecting rods connecting the toggles with the wrist pins of the double crank, and means for adjusting one of the toggles relatively to the cross-head, thereby to equalize the positions of the embossers with relation to the bed plate.

49. In a machine of the character described, the combination of an embosser-head having embossers, a cutter-head having cutters, a clearer plate, means yieldably to connect the clearer plate with the cutter-head, spring means yieldingly to support the embosser head on the clearer plate, a cross-head, means to secure the cutter-head to the cross-head, a bed plate, stops thereon, means to reciprocate the cross-head that the embossers and cutters may emboss and cut out articles from material fed over the bed plate, and holding and releasing means carried by the cross-head for automatically intermittently preventing and admitting movement of the embosser-head toward the cross-head.

50. In a machine of the character described, the combination of an embosser-head having embossers, a cutter-head having cutters, a cross-head carrying the embosser and cutter heads, a clearer plate, spring means yieldingly to connect the clearer plate with the cutter-head, spring means yieldingly to support the embosser head on the clearer plate, a bed plate having stops thereon, means to reciprocate the cross-head and thereby cause the clearer plate to engage and be arrested by the stops, and holding means carried by the cross-head for preventing movement of the embosser-head toward the cross-head and causing energization of the embosser-head springs as the embosser-head approaches the bed plate, said holding means having provision for automatically releasing the same that the embosser springs may retract the embossers from the material on completion of the embossing operation.

51. In a machine of the character described, the combination of embossers and cutters for embossing and cutting out articles from material, a clearer plate, and reciprocable means carrying and actuating the embossers and cutters and having provision for automatically causing the embossers to emboss the material and snap upward relatively to the cutters at the instant they complete the embossing, thereby to cause the cutters to clear the embossed material from the embossers, and said automatic means having provision for causing the cutters then to die out articles from the material and move upward that the embossers and clearer plate may clear the material from the cutters.

52. In a machine of the character described, the combination of a cross-head, embossers carried thereby for embossing material, means for reciprocating the cross-head, means for retracting the embossers from the material energized on advance of the cross-head toward the material, and means carried by the cross-head operable to render the retracting means effective to withdraw the embossers from the material as the cross-head advances toward the material.

THOMAS L. GREEN.
CHARLES H. WILLIAMS.